(12) United States Patent
McLeod et al.

(10) Patent No.: US 8,944,594 B2
(45) Date of Patent: Feb. 3, 2015

(54) SYSTEMS AND METHODS FOR CREATING ABERRATION-CORRECTED GRADIENT INDEX LENSES

(71) Applicant: The Regents of the University of Colorado, Denver, CO (US)

(72) Inventors: Robert R. McLeod, Boulder, CO (US); Michael Cole, Longmont, CO (US)

(73) Assignee: The Regents of the University of Colorado, Denver, CO (US)

( * ) Notice: Subject to any disclaimer, the term of this patent is extended or adjusted under 35 U.S.C. 154(b) by 193 days.

(21) Appl. No.: 13/715,606

(22) Filed: Dec. 14, 2012

(65) Prior Publication Data
US 2014/0168603 A1    Jun. 19, 2014

(51) Int. Cl.
B29D 11/00  (2006.01)
G02C 7/02   (2006.01)

(52) U.S. Cl.
CPC ..................................... *G02C 7/027* (2013.01)
USPC ...................................... 351/159.74; 264/1.1

(58) Field of Classification Search
CPC ............. G02B 6/0281; G02B 6/02357; G02B 6/0283; G02B 6/0285; G02B 6/0286; G02B 6/0288; G02B 6/268
USPC .......... 351/159.73–159.74; 359/900; 264/1.1, 264/1.32
See application file for complete search history.

(56) References Cited

U.S. PATENT DOCUMENTS 5,541,039 A *  7/1996  McFarland et al. ........... 430/290
7,762,667 B2 * 7/2010  Andino et al. ................ 351/212

FOREIGN PATENT DOCUMENTS

| JP | 10-249953 A | 9/1998 |
| WO | WO 2006/029281 A2 | 3/2006 |
| WO | WO 2009/097409 A1 | 8/2009 |

OTHER PUBLICATIONS

Dendukuri, Dhananjay et al., "Continuous-Flow Lithography for High-Throughput Microparticles Synthesis," Nature Materials, vol. 5, pp. 365-369, May 2006.
Jang, Ji-Hyun et al., "A Route to Three-Dimensional Structures in a Microfluidic Device: Stop-Flow Interference Lithography," Angew. Chem. Int. Ed., vol. 46, pp. 9027-9031, 2007.
Scott, Timothy F. et al., "Two-Color Single-Photon Photoinitiation and Photoinhibition for Subdiffraction Photolithography," Science, vol. 324, pp. 913-917, May 15, 2009.
International Application No. PCT/US2013/073930, International Search Report & Written Opinion, 11 pages, Mar. 26, 2014.

* cited by examiner

*Primary Examiner* — James Greece
(74) *Attorney, Agent, or Firm* — Perkins Coie LLP (57) ABSTRACT

Embodiments include methods, systems, and/or devices that may be used to create aberration-corrected gradient index lenses. In some embodiments, data related to aberration measurements is received. This data is processed and an inverse map is generated to compensate for the aberration measurements. An intensity pattern corresponding to the inverse map is then projected onto a blank lens (e.g., to locally polymerize a mobile monomer) to create an exposed lens with a gradient index to correct for the aberration measurement. For example, in some embodiments, the lens may be an intraocular lens and the data can be generated by using a wavefront sensor to measure aberrations (e.g., an optical phase profile to correct defocus or astigmatism) in a patient's eye.

9 Claims, 6 Drawing Sheets

SYSTEMS AND METHODS FOR CREATING ABERRATION-CORRECTED GRADIENT INDEX LENSES

GOVERNMENT LICENSE RIGHTS

This invention was made with government support under grant numbers IIP0637355 and IIP0822695 awarded by the National Science Foundation. The government has certain rights in the invention.

TECHNICAL FIELD

Various embodiments of the present invention generally relate to systems and methods for creating customized lenses. More specifically, some embodiments relate to systems and methods for creating aberration-corrected gradient index lenses.

BACKGROUND

A lens is an object that can be used to alter the behavior of light. For example, a lens can transmit and refract light towards a focal point. Lenses are typically made of plastic or glass and can be used in a wide range of applications and imaging systems. For example, lenses can be found in binoculars, telescopes, endoscopic probes, microscopes, projectors, cameras, and projectors all use lenses. In addition, corrective lenses such as eye glasses and contacts can be used for the correction of visual impairments (e.g., defocus, astigmatism, and higher-order aberrations).

Given the variety of applications and types of objectives, it has traditionally been impractical to stock all lenses that could possibly be needed. With corrective lenses, for example, the accuracy of the correction is limited by the number of lenses that can economically be manufactured and stocked. Thus adding finer divisions or higher order aberrations (e.g., coma) would improve patient vision but at the cost of much larger inventory, which becomes expensive to fabricate and maintain. In addition, traditional systems for creating customized lenses that correct for various aberrations are expensive and can have a significant lag time. As a result, systems and methods are needed for efficiently creating customized lenses.

SUMMARY

Embodiments include methods, systems, and devices that may be used to create customized aberration-corrected gradient index lenses (e.g., intraocular lenses). In some embodiments, aberration data is received. The aberration data may correspond to measurements specific to a patient, specifications to correct a specific aberration (e.g. near-sightedness of 2 diopters), may indicate no aberrations at all (e.g., a person with perfect vision who none-the-less needs an intraocular lens), and/or an arbitrary function which can be used to create particular aberration. For example, in some embodiments, the arbitrary function may be used to create multi-focal, extended depth of focus, and the like.

The aberration data can be processed and an inverse map generated to compensate for the aberration data. An intensity pattern corresponding to the inverse map is then projected onto a blank lens (e.g., to locally polymerize a mobile monomer) to create an exposed lens with a gradient index to correct, compensate, and/or create the aberration. For example, in some embodiments, the lens can be an intraocular lens and the data can be generated by using a wavefront sensor to measure aberrations (e.g., an optical phase profile to correct defocus or astigmatism) in a patient's eye.

The exposed lens can then be developed in a monomer-rich environment before the lens is fixed with a flood cure. In at least one embodiment, a transparent mold can be used to hold the blank lens. The exposed lens can be removed from the transparent mold before developing the exposed lens in the monomer-rich environment. In some cases, the monomer-rich environment can be on both sides of the exposed lens.

A system for creating customized lenses using a multi-stage polymerization process can include an exposure chamber, an optical pattern generator, an optical window, a material delivery subsystem, and/or a diffusion chamber. The exposure chamber can house materials for forming a customized gradient-indexed lens (e.g., an intraocular lens, a contact lens, telescopic lens, a microscopic lens, or an endoscopic lens). The materials can include a photosensitive liquid having mobile monomers that can be locally polymerized when exposed to an optical intensity pattern. The optical pattern generator can be configured to receive aberration data and generate an intensity pattern to correct the aberration data by forming a customized gradient-index.

The optical window can be configured to separate the exposure chamber from the optical pattern generator. In accordance with some embodiments, the optical window allows the intensity pattern to enter the exposure chamber thereby creating an exposed lens (e.g., by forming an upper surface of a mold). The optical widow can include a solid layer, for example, to provide mechanical support and shape retention. In some embodiments, the solid layer can be infused with a liquid to provide a replenishable release layer. The material delivery subsystem can be configured to deliver the materials to the exposure chamber. The diffusion chamber can be configured to enable diffusion normal to the surface of the exposed lens. In some embodiments, the diffusion chamber can be the exposure chamber.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to systems and methods for creating customized lenses (e.g., intraocular lenses, contact lenses, telescopic lenses, microscopic lenses, endoscopic lenses, and others). More specifically, some embodiments relate to systems and methods for creating aberration-corrected gradient index lenses and techniques for economical methods to fabricate lenses with customized optical and/or mechanical properties (e.g., to an individual patient). Additionally, a multi-stage polymerization process can be used to allow the lens modulus to be changed after insertion (e.g., into a patient or device) in order to minimize an incision size, match physiological requirements, or access requirements.

For example, in one or more embodiments, polymer materials and novel processing techniques can be used to create phakic or pseudophakic intraocular lenses with improved visual performance and ease of implantation. Existing intraocular lenses correct patient vision by bending rays at the front and back surface of a curved lens. Various embodiments of the disclosed methods add a 2D or 3D gradient refractive index to the body of the lens, providing for significantly greater control of the lens performance. Since the crystalline lens of the human eye is a gradient index structure, there is physiological motivation that this degree of control is important. The ability to customize this gradient structure to the individual patient offers significant potential visual benefits. The human eye operates very far from the theoretical diffraction-limited performance. This has inspired custom eyeglasses and contact lenses to correct the aberrations beyond defocus and astigmatism that are traditional in vision correction today. These "higher order aberration correction" methods have the significant drawback that the artificial lens is not fixed relative to the eye. Eyeglasses are particularly egregious here, but the movement of a contact lens also limits the degree of correction possible. Intraocular lenses, on the other hand, are fixed relative to the eye after insertion and thus offer an ideal location for aberration correction. Various embodiments of the proposed method should enable vision correction beyond 20/20.

Some embodiments provide for the formation of multi-focal lenses (e.g., multi-focal intraocular lenses). Multi-focal lenses may compensate for the lack of accommodation by creating several simultaneous focused images at different distances along the optical axis. The visual system rejects the out-of-focus images and concentrates on the nearest in-focus image. However, users complain of glare and poor contrast. Existing multi-focal lenses divide the lens up into annular rings, each of which has a Fresnel lens with different focal lengths. This has a number of disadvantages including diffractive color and scatter off of the sharp transitions between lenses. In contrast, the extra degrees of freedom present in the GRIN structure can be exploited to make multiple foci with very low color dispersion, smooth transitions, and better out-of-focus performance. For example, the GRIN lens can be designed to control the position of out-of-focus light from other foci to minimize visual interference.

Finally, the use of a final cure to structure the mechanical properties of the lens may be of use in accommodating intraocular lenses. These attach to the ciliary body of the eye in order to change shape and thus focal length, just as the natural crystalline lens does. The ability to tailor both the 3D index and 3D modulus of the lens will enable optimal coupling of the ciliary actuation to modify the lens focal length.

While, for convenience, embodiments of the present invention are described with reference to creating customized lenses, embodiments of the present invention are equally applicable to various other types of optical devices including, but not limited to, holograms, diffraction gratings and optical waveguides.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. Embodiments of the present invention may be provided as a computer program product which may include a machine-readable medium having stored thereon instructions which may be used to program a computer (or other devices or machines) to perform a process or to cause a process to be performed. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may", "can", "could", or "might" be included or have a characteristic, that particular component or feature is not required to be included or have the characteristic.

General Description

Figure 1:
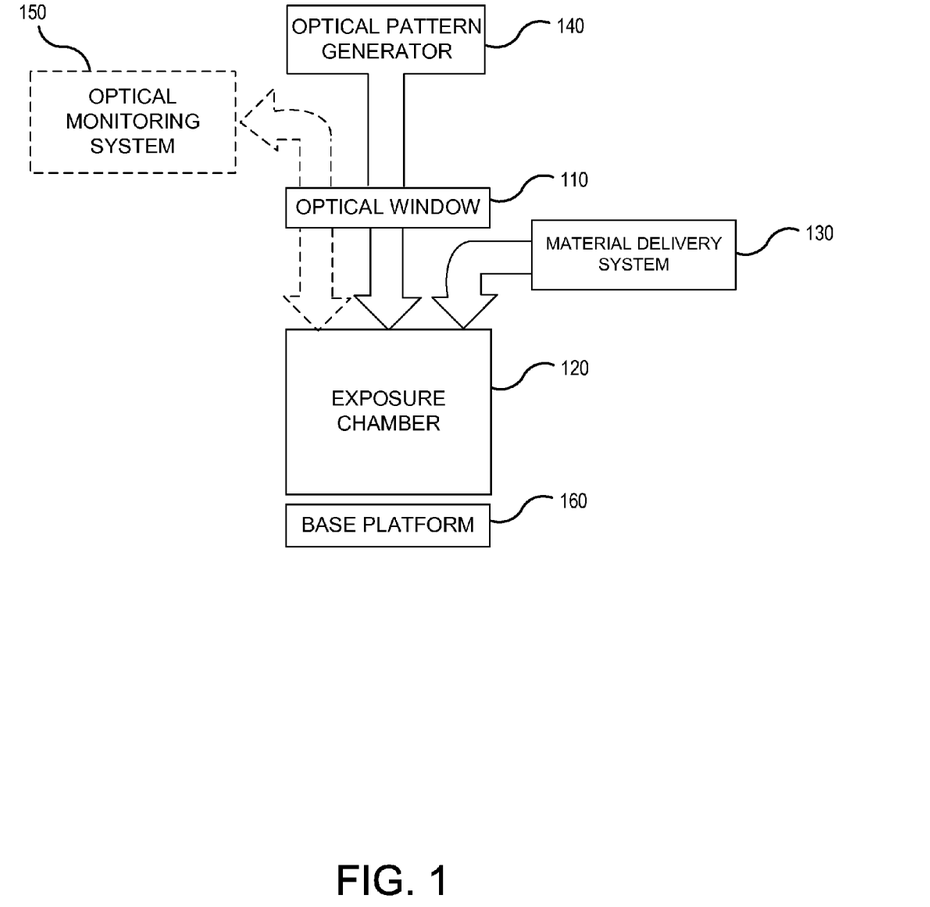
FIG. 1 illustrates a high-level block diagram of a processing environment in which aberration-corrected gradient index lenses may be produced in accordance with various embodiments of the present invention.

FIG. 1 illustrates a high-level block diagram of a processing environment 100 in which aberration-corrected gradient index lenses may be produced in accordance with various embodiments of the present invention. Other embodiments may use simpler, or more complex, processes for creating the aberration-corrected gradient index lenses or other optical components. For example, a molding process may be used in some embodiments to create the lenses.

As illustrated in FIG. 1, the processing environment 100 provides for various components that can be used to perform multiple steps used in a single machine. The machine can include an optical window 110, exposure chamber 120, material delivery system 130, optical pattern generation system 140, optical monitoring system 150, and base platform 160. In contrast to traditional photolithography systems, spinning is replaced by micro-fluidic injection and planarization is replaced by molding on the non-contact window. In some embodiments, a mold may be used to slowly release a radical inhibitor (e.g., O2, N-nitroso-N-phenylhydroxylamine aluminum complex (NPAL), nitroxyl free radical (TEMPO), N,N'-di-isopropyl-p-phenylenediamine, and hydroquinones) to maintain a ~100 nm thick layer of material precursors that is not photosensitive and therefore stays in the liquid state even when illuminated by the photomask.

Traditional optical pattern generators for photolithography consist of photomasks illuminated by an appropriate light source. For multilayer structures fabricated using a sequence of machines, re-alignment of the structure to the photomask can be a significant to many-layer nano-patterning, is vastly simplified by repetitive exposures on a single tool. The layout also allows the material to be held in a thin, liquid layer between the mold and the previously fabricated layer, removing the traditional need for binders and solvents, accelerating reaction rates and minimizing material waste. The system thus combines the high-throughput and non-contact advantages of mask projection with the surface control of soft lithography. By compressing the multiple processes of traditional lithography to a single machine, thousands of individual layers can be rapidly built up into complex, 3D materials.

In accordance with various embodiments of the present invention, optical window 110 provides an entry point into the exposure chamber 120 with low optical aberrations for light from the optical pattern generation system 140 and optical monitoring system 150. The external surface of optical window 110 can be designed to conform to a specified shape (e.g., flat or spherical) to within a fraction of the optical wavelength and allow this shape to be maintained during the exposure. As a result, optical window 110 may have a specified level of stiffness.

To determine the shape of the upper, working surface of the lens being formed, the inner surface of optical window 110 may be a mold against which the liquid precursors are solidified such that each layer of solidified material takes on the approximate shape of the mold. This mold may be a simple shape (e.g., flat or spherical) and/or have a complex micro- to nano-scale profile (e.g., a diffraction grating). In at least one embodiment, a liquid layer below the interior surface can be modulated in thickness to control the effective resolution of this molding process.

The interior of optical window 110 may be arranged to resist attachment of the solidified liquids such that high throughput one-photon absorption can be used for the photolithography. The inner surface may be resistant to bonding with solidifying liquid precursors. This "non-stick" behavior may include a chemical treatment of the window, as is known in the art. Photo-nanoimprint lithography coats the soft (e.g., polydimethylsiloxane (PDMS)) mold with a chemical release agent before UV curing. Here, many layers may be sequentially fabricated against this treatment. Scanning or projection optical lithography can selectively pattern the material properties including liquid/solid phase, density, index, or chemical composition. The interior of optical window 110 can shape the surface of the part on large scale (e.g., a lens) or on fine scale similar to photo-nanoimprint lithography.

The exterior of optical window 110 may be of sufficient surface optical quality that it is low scatter and approximating the desired shape to within a fraction of the optical wavelength. Optical window 110 can be flat, spherical or aspherical to satisfy requirements of the optical pattern generator (e.g., mask projection optics) or to conform to the shape of the interior surface. The body of optical window 110 may include multiple layers and/or internal fluidic channels that may be sufficiently stiff to maintain its interior and exterior shape under pressure of material delivery system 130. In some embodiments, optical window 110 may be of low volume optical scatter and volume phase uniform to enable sufficient contrast and resolution for the light from the optical pattern generation system 140 and optical monitoring system 150.

The interior of optical window 110 may typically have larger surface roughness and surface height variation than is typical for an optical element in air since the difference of the index of optical window 110 and the liquid materials is much lower than the difference of the index of the window and air. That is, the optical quality of optical window 110 may be dominated by the exterior surface with its large index contrast to air, not the interior surface with its low index contrast to the liquid material precursors.

Exposure chamber 120 may include thermal control to modulate the rate of chemical reactions or diffusion. Exposure chamber 120 may be sealed (in the manner of a syringe exterior) or not, depending on the needs of other system components, chiefly material delivery system 130. The sides of the chamber can either move with the base platform plus material or the sides can be fixed in position. In the latter case, the fabricated part must not adhere to the chamber sides as the base platform is moved or the part will be damaged. Any of the methods discussed above for optical window 110 are appropriate to maintain a non-stick behavior at the chamber sides. Some embodiments limit optical exposure of the liquid precursors such that the material adjacent to the chamber sides stays in a liquid state.

If a photosensitive, liquid layer remains at the edge of the part (e.g., lens) after some thickness has been built up and base platform 160 is stopped, the full part area can be exposed to light. This will cause the liquid layer at the edges of the part to solidify out to the sides of the chamber. The solid part of the chamber may now be removed and: remain together, providing an external "package" to the fabricated part, or the chamber can be removed, forming a "mold" for the part in order to provide a specific shape and/or surface finish to the edges of the part.

Base platform 160 facilitates introduction of new liquid material between previously-exposed and solidified materials and the window by moving away from the window. In some embodiments, base platform 160 can move continuously or may stop during optical exposures (called "stop-flow lithography") More complex motion profiles may be used to implement specific processes. For example, the platform can be moved away from optical window 110 to allow a larger thickness of liquid between exposures steps, then returned to create a thin layer before the next photo-exposure. This can be useful in solvent wash steps or to provide larger volumes of diffusing materials.

Base platform 160 may be transparent or reflective in order to enable optical monitoring of the process. Base platform 160, like the interior of optical window 110, may provide the function of a mold from which the finished part will be removed. Alternatively, base platform 160 may remain with the part as an integral component of the finished device. In some cases, base platform 160 may comprise one or more of the following: 1) a simple substrate such as an optical flat or a semiconductor wafer; 2) an optical component such as a lens, thin-film filter, crystal, or polarizer; and 3) an electrical, optical, or mechanical element or any combination thereof.

Materials are introduced into processing system 100 as liquids and exit either via incorporation into the finished part or as "waste" liquids expelled from exposure chamber 120. Useful materials are generally those that interact with light (e.g., photopolymerizable resins) or the previously fabricated structure (e.g., solvent). Photosensitive materials can include those known in the art such as photopolymerization, photolabile (bonds that break on optical exposure), or other photo-initiated chemical changes. Non-photosensitive materials can include materials which diffuse, materials with intentionally specified optical absorption (e.g., to block optical penetration to previously fabricated layers), materials which contain suspensions of nanoparticles, cells or other small solids, or materials which chemically or physically interact with previously deposited material (e.g., solvents or developers).

An unusual material interaction possible in processing system 100 is the use of optical tweezing or trapping forces to manipulate the locations and orientations of solids suspended within a liquid. That is, some portion of the optical pattern, if focused sufficiently, can attract or repel cells, nanoparticles, carbon nanotubes, etc. and arrange these into specified patterns within the liquid layer. If this layer is later solidified by heat or photo-curing, this arrangement is permanent. Individual materials can encompass more than one of these properties, e.g., photopolymerizable liquids with diffusing monomers or suspended nanoparticles.

Material delivery system 130 delivers liquid materials that may be manipulated through micro-fluidic techniques including: 1) base platform 160 motion including simple movement away from the platform but also more complex in/out trajectories; 2) more complex base platform 160 motion including rotation; 3) pumping of material into or out of exposure chamber 120; 4) laminar flow of one or more materials to create multiple-material particles in a single exposure; and 5) non-laminar flow via an explicit mixer or through choice of channel dimensions. The platform height can be changed to control the Reynolds number and thus flow properties across the part.

Figure 2:
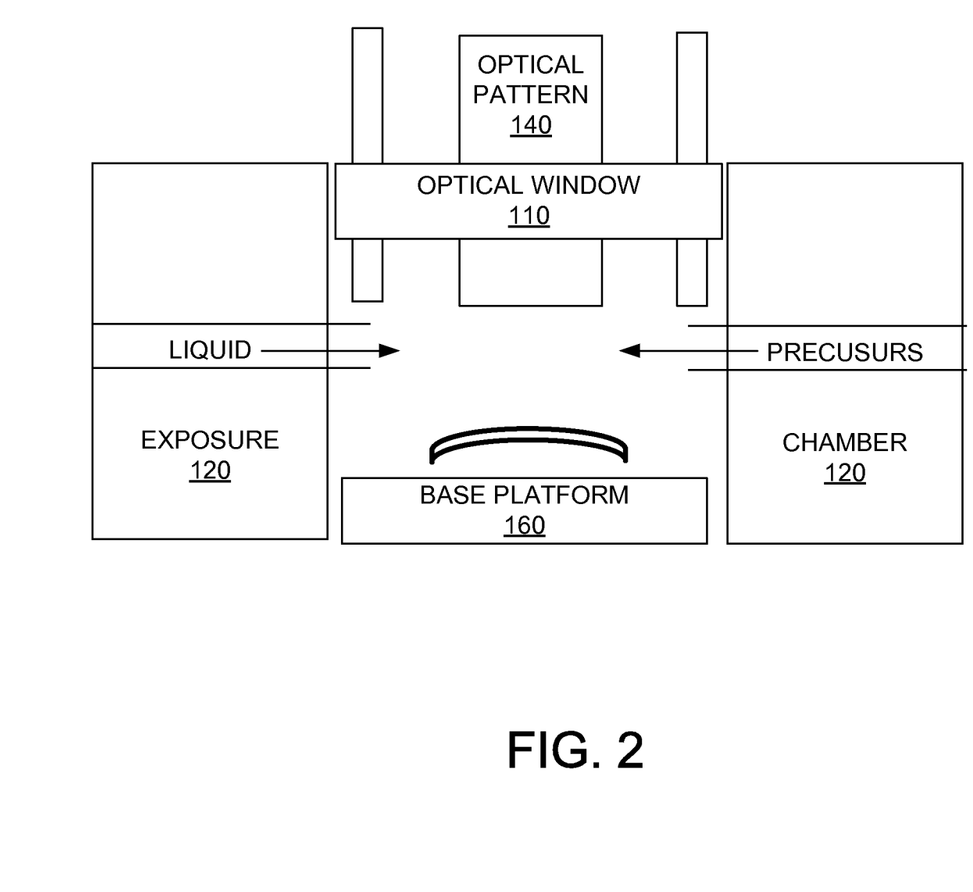
FIG. 2 illustrates simplified physical layout of a processing environment according to some embodiments of the present invention.

FIG. 2 illustrates block diagram 200 of a simplified physical layout of a processing environment according to some embodiments of the present invention. In accordance with some embodiments, optical window 110 forms the upper surface of the mold. Optical patterns generated by pattern generation system 140 may pass through optical window 110 onto the lens and/or other part. In one or more embodiments, optical window 110 allows the optical pattern to enter exposure chamber 120 without perturbation, holds and/or shapes the lens blank, and can release the exposed lens blank.

Optical window materials 110 may be composed of glass or PDMS and various fluorinated materials. Additionally, glass or other materials may be used with a "nonstick" surface layer, in which such surface layers are composed usually with PDMS or fluorinated groups. Other examples of the window/mold material may be composed of a solid infused with a liquid. In such an arrangement, the solid provides mechanical support and shape retention, whereas the liquid provides a replenishable release layer. In current window technologies, the surface contacting the resin in the mold eventually increases in adhesion (usually with each cycle). This increase in adhesion is especially problematic when radical polymerization is used to cure the resin inside the mold. The adhesion is usually very slight initially, but increases exponentially with cycle number. Currently, it is believed that grafting of the resin material onto the window/mold material is what leads to the increase in adhesion to the mold. Swelling of the resin into the window/mold material enhances this mechanism and causes mold adhesion faster than if the resin has very low solubility inside the mold material.

With a solid infused with a liquid, if the liquid makes up a large portion of the material (greater than 25%, more preferred greater than 50%, and most preferred greater than 75%—with keeping the desired mechanical properties of the mold as the factor that limits the amount of liquid in the material), then it is expected that a similar percentage of the liquid will be at the interface of the mold and the resin. Any chain transfer that occurs to the liquid molecules does not increase the adhesion since the liquid molecule will be now attached to the cured resin and will be pulled from the mold-resin interface.

New liquid will replace any liquid removed in such manner as equilibrium is restored. Thus, the mold surface is restored to a non-grafted state and subsequently preventing adhesion from increasing as quickly as without a replenishable surface. The increase in adhesion to the mold is decreased with increasing amounts of liquid. Some simple examples of materials that fall into this class of materials are hydrogels, crosslinked PDMS with lower molecular weight (liquid), PDMS as a plasticizer, and thermoplastic materials with large amounts of plasticizer present (more appropriately used for flat window materials that do not require holding of 3 dimensional shape). The resin and mold compositions should be chosen such that the resin and mold material are incompatible (meaning that the resin does not swell the mold material substantially—with the mold swelling less than 5%, more preferably less than 1%, and most preferably less than 0.25%). The liquid inside the mold material should also have the same incompatibility with the resin (now measured as solubility of the two liquids with one another).

The liquid infused window materials can be made by curing a mold material (e.g., PDMS) and then allowing the desired liquid to diffuse into the mold material (causing swelling of the mold material). Preferentially, to prevent alteration of the mold shape, the mold material can be cured with the liquid already present. Other more complicated ways of achieving a liquid infused mold material (such as selective cleaving of pendant side chains on the polymer backbone of the mold material to form the liquid in situ) are anticipated and are covered by this disclosure as giving the same end result in properties. These liquid infused solids have the potential of increasing the life of a mold and increase the number of parts that can be made with that mold.

The time for monomer diffusion across (i.e., transverse to the surface) the L=approximately 4 mm pupil area is quite long. Typical diffusion coefficients are on the order of D=1 microns$^2$/s, so diffusion times are multiples of $L^2/D$=0.5 years. This can be reduced by placing the developing lens blanks in an oven to increase D. The upper limit on temperature is typically set by the thermal degradation of some component of the formulation such as the photo initiator. Upper limits of 60 to 80 degrees C. are typical. Various embodiments of the present invention avoid this very long development time by enabling diffusion normal to the surface of the lens. Since the lens thickness is typically t=approximately 100 microns, this reduces the diffusion time relative to diffusion in the width by a factor of $(L/t)^2$, reducing the characteristic diffusion time at room temperature to 3 hours. This normal diffusion is made possible by placing the exposed lens in a liquid or solid monomer-rich environment. This can be done within the exposure chamber or as a separate step. The monomer-rich environment can be on both sides of the blank (decreasing the development rate by a factor of two) or just one side.

Finally, a uniform optical exposure may be used to polymerize all remaining monomer, leaving the lens optically inert and bonding all small molecular weight species into the polymer matrix. A two-stage polymerization scheme may be used in which the flood cure can alter the mechanical properties of the polymer matrix via additional cross-linking. This raises the glass transition temperature of the polymer, rendering it more mechanically rigid. In various embodiments, for example in intraocular lenses, this chemistry can be exploited such that the lens modulus during insertion is low, enabling it to be deformed to fit through a small incision. After surgical insertion and manual placement by the surgeon, the final flood cure can take place in vivo, causing the modulus to increase as needed for long-term use.

Other chemistries/mechanisms, other than flood cure such as simple wet chemistry approaches, are also capable of increasing the lenses material's modulus after insertion into the eye. For example, absorption of water can lead to an increase in modulus for certain hydrogels. This allows for a smaller intraocular lens to be inserted and have it swell to the correct size and modulus—the optical patterning of the intraocular lens can occur before insertion, after insertion but before swelling (swelling can be delayed), or even after insertion and after swelling of the intraocular lens. Another possibility is the injection of a catalyst that causes the crosslinking of the intraocular lens material (e.g., a change in pH or a bismuth-based catalyst that would be safe in vivo). And yet another possibility is the injection of a crosslinking agent into the intraocular lens cavity (e.g., calcium ions for phosphate polymers). Lastly, it is also contemplated that the body's temperature can be the catalyst for increasing the modulus of the material by starting a thermal reaction in the intraocular lens material. All such modulus increasing reactions should occur within one day of insertion, less than one hour, or less than five minutes.

Figure 3A:
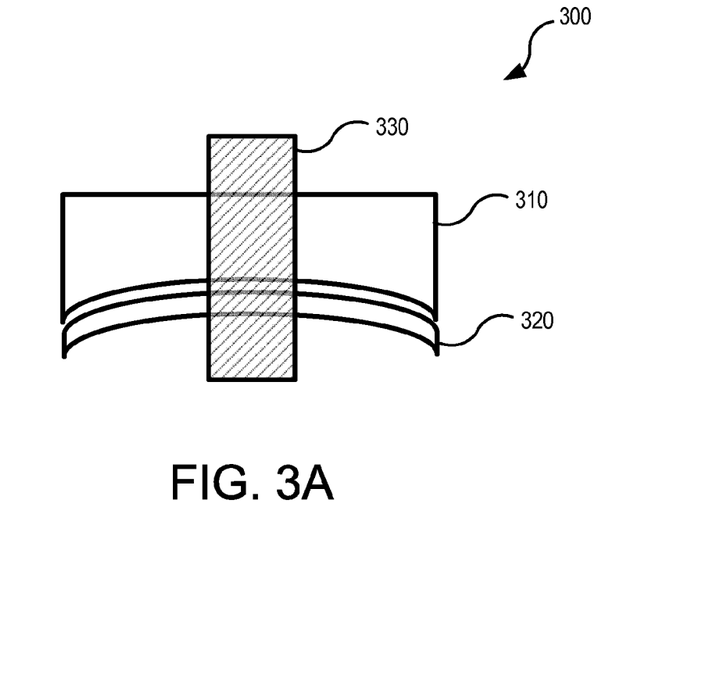
FIGS. 3A-3B show the illumination of a lens in accordance with one or more embodiments of the present invention.
Figure 3B:
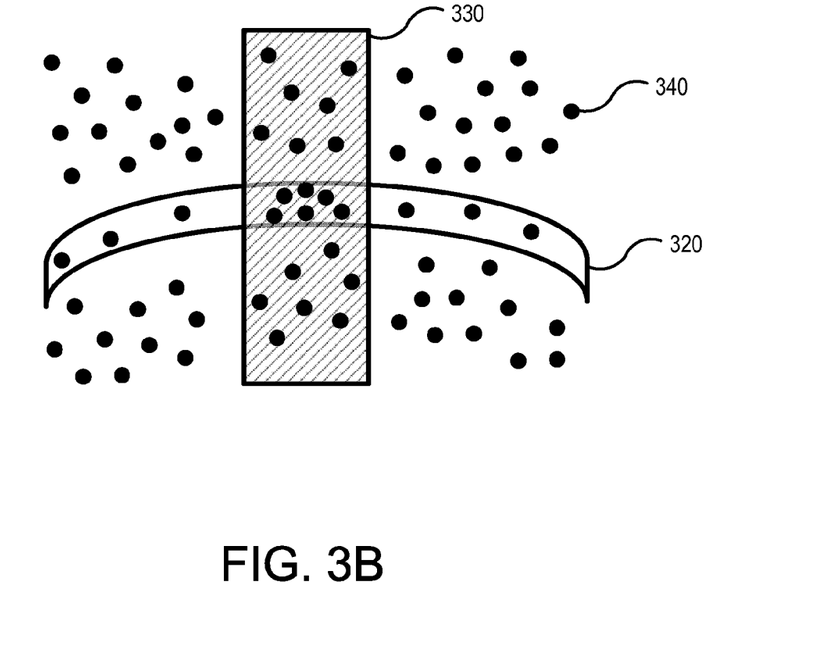

FIGS. 3A-3B show the illumination of a lens in accordance with one or more embodiments of the present invention. The embodiments illustrated by FIGS. 3A and 3B show a mold 310 with a lens blank 320 being exposed to an optical intensity pattern 330. The process begins by the casting of lens blank 320 from an initially-liquid formulation which consists of monomer and initiators, plus other components to control biological, optical or mechanical properties of the finished lens. One or several such blanks of different optical power or mechanical size could be created. Either in the original mold 310 or in a second exposure chamber, lens blank 320 is then exposed to two-dimensional optical intensity pattern 330 which locally polymerizes a small, mobile monomer 340, rendering it immobile. Diffusion of the replacement monomer increases the density and refractive index of the region, roughly proportional to the optical intensity pattern.

Figure 4:
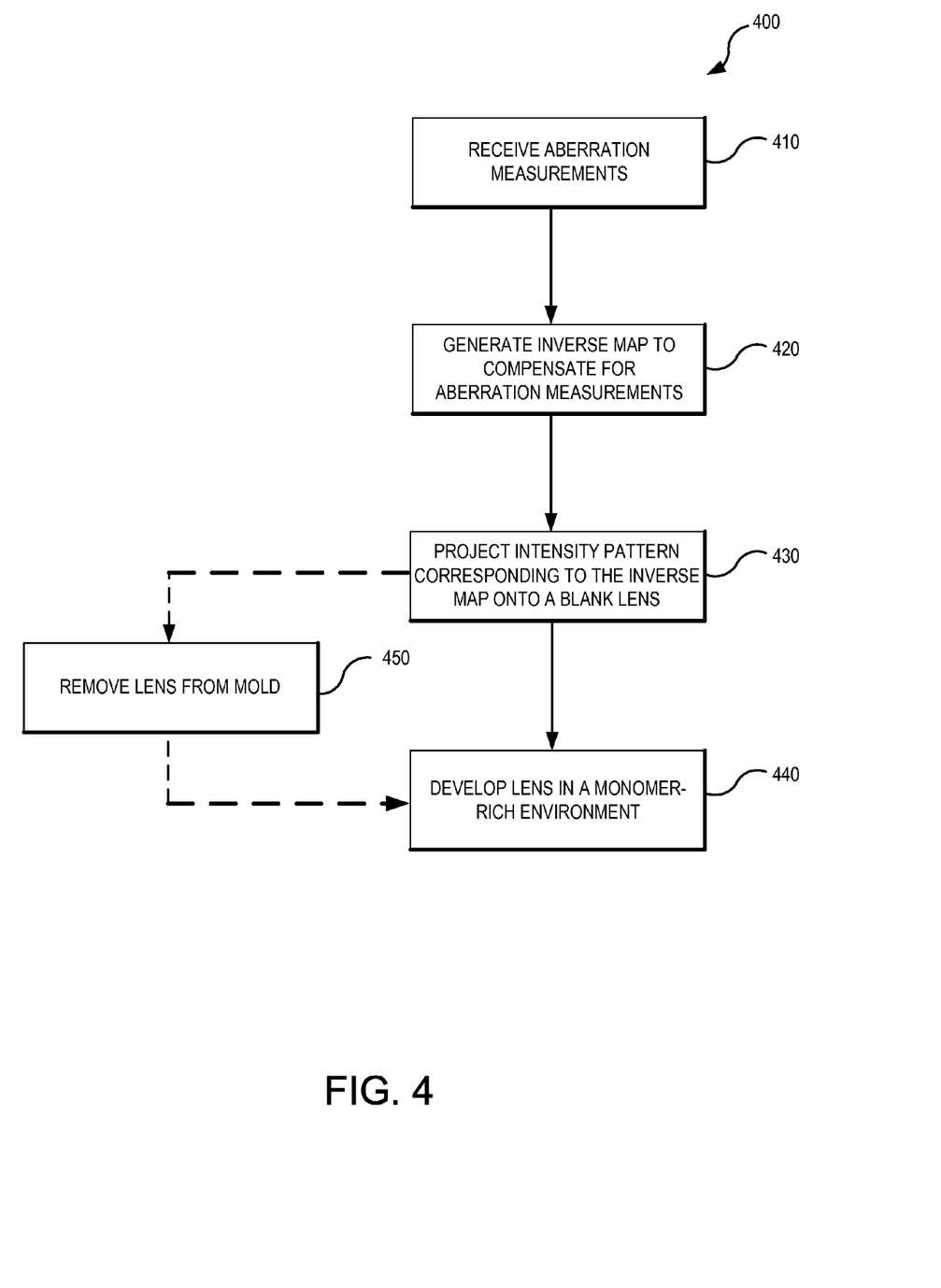
FIG. 4 is flowchart with a set of operations for creating a customized lens in accordance with at least one embodiment of the present invention.

FIG. 4 is flowchart with a set of operations 400 for creating a customized lens in accordance with at least one embodiment of the present invention. During receiving operation 410, a set of aberration measurements (or aberration data) may be received. Generation operation 420 processes the set of aberration measurements to generate an inverse map to compensate for the aberration measurements or other aberration data. For example, in some embodiments, generation operation 420 may include inverting the aberration measurement and then calculating an intensity pattern that will cause the material to record the inverted aberration measurement. In order to calculate the desired intensity pattern, knowledge of the photopolymer response may be used.

For example, in some embodiments, the desired refractive index may be derived from the aberration measurements (or map) or, more generally, the desired function of the lens. The material responds to light with a change in index of refraction, but the relationship is not perfectly linear, so the intensity profile may be chosen to give the desired index profile. The response of the material to light may be sublinear as is well known for radical photochemistry. Similarly, the response of the material to light may saturate as particular species such as the photoinitiator is consumed. Finally, the response may not be local due to coupling of different regions via diffusion. In general, the response of any material to light may be calibrated and the response taken into account when designing the optical stimulus in order to create a desired refractive index profile.

Projection operation 430 projects an intensity pattern corresponding to the inverse map onto a blank lens. The lens can then be developed in a monomer-rich environment during development operation 440. In some embodiments, a mold may be used to provide structural support for the blank lens. In those embodiments, projection operation 430 may branch to removal operation 450 to remove the lens from the mold before beginning development operation 440.

Figure 5:
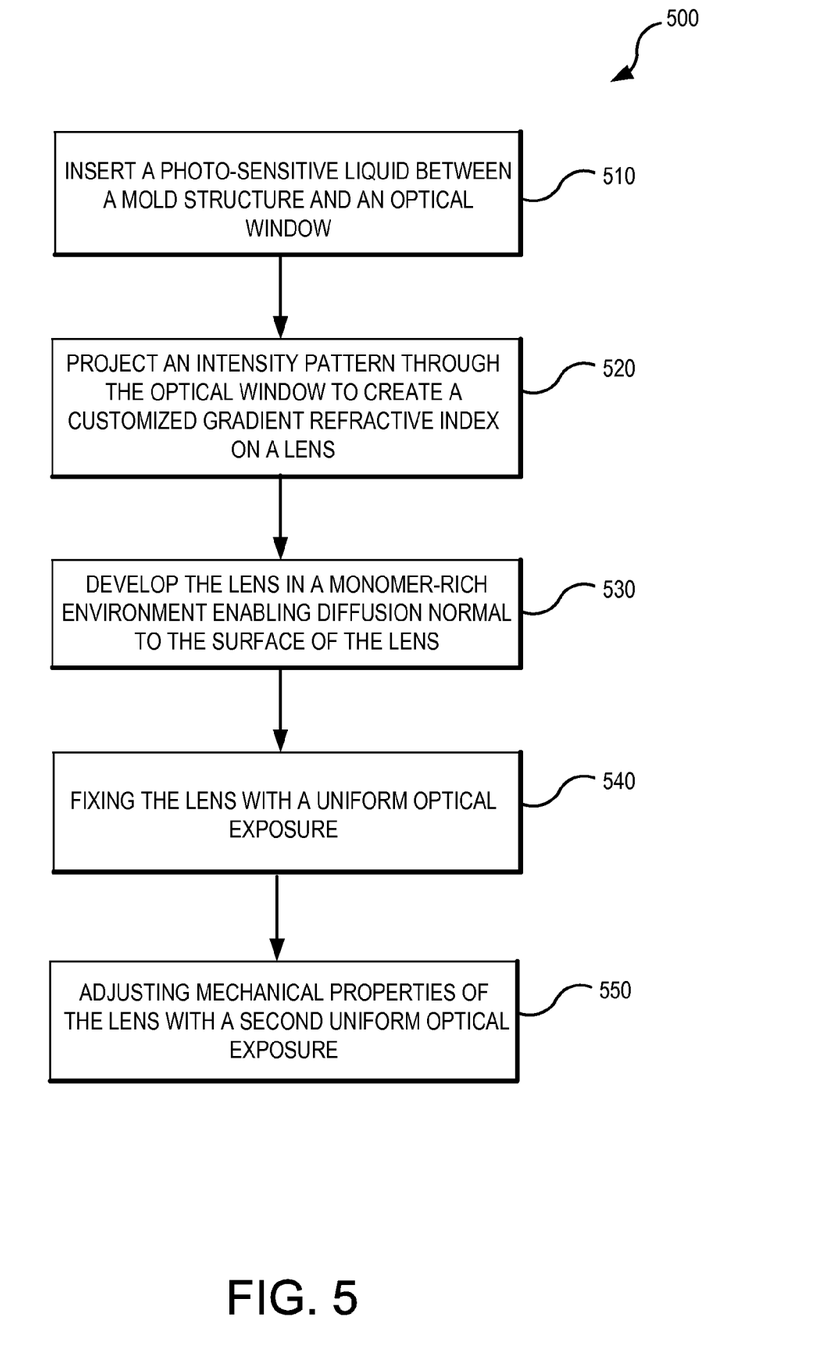
FIG. 5 is a flowchart with a set of operations for creating a customized lens in accordance with various embodiments of the present invention.

FIG. 5 is a flowchart with a set of operations 500 for creating a customized lens in accordance with various embodiments of the present invention. As illustrated in FIG. 5, a photosensitive liquid can be inserted between a mold structure and an optical window during insertion operation 510. In some embodiments, insertion operation 510 can be divided into multiple additional operations. For example, in one embodiment, a first insertion operation can be used to insert a liquid into a mold to create a solid lens blank (e.g., to mold the blank). Then, during a second insertion operation, this solid, photosensitive blank can be inserted into an exposure system.

Projection operation 520 can project an intensity pattern through the optical window onto the photo-sensitive liquid to create a customized gradient refractive index on a lens to provide aberration correction. In at least one embodiment, the customized gradient refractive index may be a two-dimensional or three-dimensional gradient refractive index. In other embodiments, the customized gradient refractive index may create two or more simultaneous focused images at different distances along the optical axis.

During development operation 530, the lens can be developed in a monomer-rich environment by enabling diffusion normal to the surface of the lens. Fixing operation 540 can then fix the lens with a uniform optical exposure to polymerize all remaining monomers. Fixing the lens can include a multi-stage polymerization process. For example, a two-stage polymerization process may be used in various embodiments where the second stage increases the mechanical rigidity of the lens by raising the glass transition temperature of the polymer. In some embodiments, adjustment operation 550 can be used to adjust the mechanical properties of the lens with a second uniform optical exposure. For example, adjustment operation 550 could be performed thermally (i.e., a post bake). In some embodiments, adjustment operation 550 and fixing operation 540 may be combined into a single operation where the same optical exposure could be used for fixing operation 540 and adjustment operation 550.

Exemplary Computer System Overview

Figure 6:
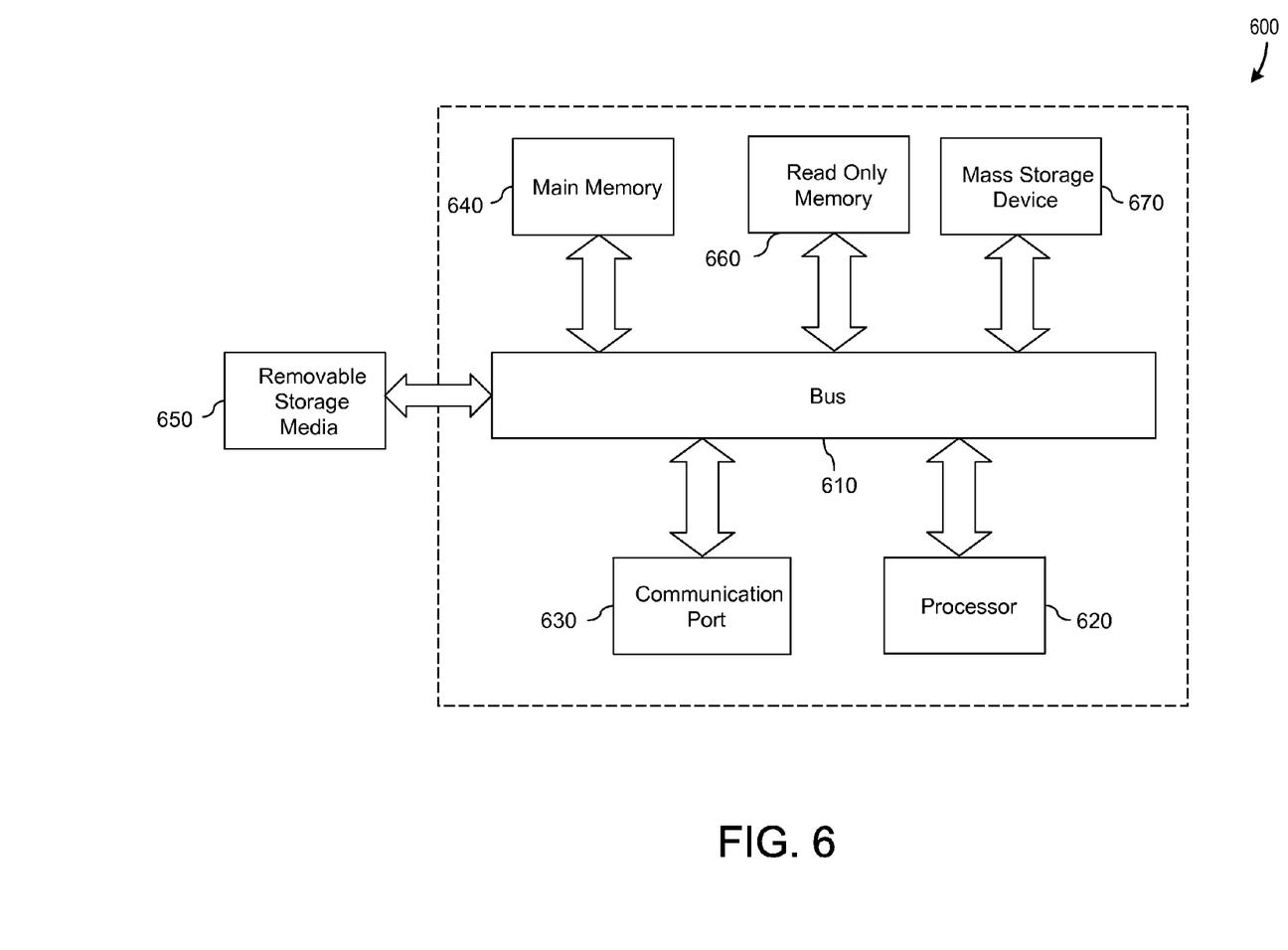
FIG. 6 illustrates an exemplary computer system that may be used in one or more embodiments of the present invention.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps or cause one or more hardware components to perform the steps. Alternatively, the steps may be performed by a combination of hardware, software, and/or firmware. As such, FIG. 6 is an example of a computer system 600 with which embodiments of the present invention may be utilized. According to the present example, the computer system includes a bus 610, at least one processor 620, at least one communication port 630, a main memory 640, a removable storage media 650, a read only memory 660, and a mass storage 670.

Processor(s) 620 can be any known processor, such as, but not limited to, an Intel® Itanium® or Itanium 2® processor(s), or AMD® Opteron® or Athlon MP® processor(s), or Motorola lines of processors. Communication port(s) 630 can be any of an RS-232 port for use with a modem-based dialup connection, a 10/100 Ethernet port, or a Gigabit port using copper or fiber. Communication port(s) 630 may be chosen depending on a network such a Local Area Network (LAN), Wide Area Network (WAN), or any network to which the computer system 600 connects.

Main memory 640 can be Random Access Memory (RAM), or any other dynamic storage device(s) commonly known in the art. Read only memory 660 can be any static storage device(s) such as Programmable Read Only Memory (PROM) chips for storing static information such as instructions for processor 620.

Mass storage 670 can be used to store information and instructions. For example, hard disks such as the Adaptec® family of SCSI drives, an optical disc, an array of disks such as RAID, such as the Adaptec family of RAID drives, or any other mass storage devices may be used.

Bus 610 communicatively couples processor(s) 620 with the other memory, storage and communication blocks. Bus 610 can be a PCI/PCI-X or SCSI based system bus depending on the storage devices used.

Removable storage media 650 can be any kind of external hard-drives, floppy drives, IOMEGA® Zip Drives, Compact Disc-Read Only Memory (CD-ROM), Compact Disc-Re-Writable (CD-RW), or Digital Video Disk-Read Only Memory (DVD-ROM).

The components described above are meant to exemplify some types of possibilities. In no way should the aforementioned examples limit the scope of the invention, as they are only exemplary embodiments.

In conclusion, the present invention provides novel systems, methods and arrangements for creating aberration-corrected gradient index lenses. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A system for creating customized lenses using a multi-stage polymerization process, the system comprising:
an exposure chamber materials for forming a customized gradient-indexed lens, wherein the materials include a photo-sensitive liquid having mobile monomers that can be locally polymerized when exposed to an optical intensity pattern;
an optical pattern generator configured to receive a desired gradient-index pattern corresponding to aberration data and generate an intensity pattern to compensate for the aberration data by forming a customized gradient-index;
an optical window configured to separate the exposure chamber from the optical pattern generator, wherein the optical window allows the intensity pattern to enter the exposure chamber thereby creating an exposed lens.

2. The system of claim 1, wherein the optical window forms an upper surface of a mold.

3. The system of claim 1, further comprising a material delivery subsystem to deliver the materials to the exposure chamber.

4. The system of claim 1, wherein the customized gradient-indexed lens is an intraocular lens, a contact lens, telescopic lens, a microscopic lens, or an endoscopic lens.

5. The system of claim 1, wherein the optical window includes a solid layer to provide mechanical support and shape retention.

6. The system of claim 5, wherein the solid layer is infused with a liquid to provide a replenishable release layer.

7. The system of claim 6, wherein the liquid is greater than twenty-five percent of the optical window.

8. The system of claim 1, further comprising a diffusion chamber to enable diffusion normal to the surface of the exposed lens.

9. The system of claim 8, wherein the diffusion chamber is the exposure chamber.

* * * * *